(12) United States Patent
Roba et al.

(10) Patent No.: US 6,672,110 B2
(45) Date of Patent: Jan. 6, 2004

(54) METHOD OF FORMING AN OPTICAL FIBER PREFORM BY COMBUSTIONLESS HYDROLYSIS

(75) Inventors: Giacomo Stefano Roba, Monza (IT); Marco Arimondi, Pavia (IT); Donata Piccolo, Milan (IT); Sabrina Fogliani, Segrate (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 0 days.

(21) Appl. No.: 09/465,016

(22) Filed: Dec. 16, 1999

(65) Prior Publication Data

US 2003/0029204 A1 Feb. 13, 2003

Related U.S. Application Data

(60) Provisional application No. 60/113,940, filed on Dec. 24, 1998.

(30) Foreign Application Priority Data

Dec. 17, 1998  (EP) ............................................... 98123990

(51) Int. Cl.[7] .............................................. C03B 37/07
(52) U.S. Cl. ............................ 65/384; 65/395; 65/413; 65/488; 65/421; 423/336
(58) Field of Search .......................... 65/395, 413, 384, 65/421, 488; 423/336

(56) References Cited

U.S. PATENT DOCUMENTS

| | | |
|---|---|---|
| 3,806,570 A | 4/1974 | Flamenbaum et al. |
| 3,933,454 A | 1/1976 | DeLuca |
| 4,204,851 A | 5/1980 | Nolan |
| 4,414,164 A | 11/1983 | Roba et al. |
| 4,564,378 A | 1/1986 | Kuisl |
| 4,596,589 A | 6/1986 | Perry |
| 4,597,983 A | 7/1986 | Kühne et al. |
| 4,608,070 A * | 8/1986 | Roba ........................... 65/420 |
| 4,610,892 A | 9/1986 | Eisbrenner ................... 65/413 |
| 4,636,364 A | 1/1987 | Geyer ........................ 423/336 |
| 4,650,693 A | 3/1987 | Kuisl |
| 4,735,643 A | 4/1988 | Kuisl |
| 4,810,276 A | 3/1989 | Gilliland |
| 4,915,717 A | 4/1990 | Watanabe et al. |
| 4,976,943 A | 12/1990 | Pauli .......................... 423/336 |
| 5,597,398 A | 1/1997 | Ishikawa et al. |
| 5,855,860 A | 1/1999 | Nishimine ................... 423/336 |
| 6,079,225 A * | 6/2000 | Ruppert et al. .............. 65/17.2 |
| 6,312,656 B1 * | 11/2001 | Blackwell et al. .......... 423/337 |
| 6,331,689 B1 * | 12/2001 | Branston et al. ....... 219/121.59 |

FOREIGN PATENT DOCUMENTS

| | | | |
|---|---|---|---|
| DE | 35 29 962 | 3/1987 | |
| DE | 36 10 719 | 10/1987 | |
| EP | 0 160 858 | 11/1985 | |
| JP | 55-20277 | 2/1980 | .................. 65/413 |

\* cited by examiner

*Primary Examiner*—John Hoffmann
(74) *Attorney, Agent, or Firm*—Finnegan, Henderson, Farabow, Garrett, & Dunner, L.L.P.

(57) ABSTRACT

A method for manufacturing a glass preform includes supplying a first gaseous or vapor phase composition to a reaction chamber; supplying water as a second gaseous or vapor phase composition to the reaction chamber; reacting the water and the first gaseous or vapor phase composition to form an aerosol of glass particles; directing the aerosol along the reaction chamber, out of the reaction chamber, and toward a target; and depositing glass particles of the aerosol onto the target. The first gaseous or vapor phase composition is disposed to provide a hydrolyzable glass precursor. Walls of the reaction chamber have a temperature gradient in which a temperature of the walls increases in a direction of flow of the aerosol along the reaction chamber. Alternatively, a flow of the aerosol along the reaction chamber has a temperature gradient in which a temperature of the aerosol increases in the direction of flow.

55 Claims, 9 Drawing Sheets

METHOD OF FORMING AN OPTICAL FIBER PREFORM BY COMBUSTIONLESS HYDROLYSIS

This application is based on European Patent Application No. 98123990.8 filed on Dec. 17, 1998 and U.S. Provisional Application No. 60/113,940 filed on Dec. 24, 1998, the content of which is incorporated hereinto by reference.

BACKGROUND OF THE INVENTION

1. Field of the Invention

The present invention relates generally to the fabrication of glass preforms and more particularly, to a method and apparatus for forming an elongated glass optical preform used to make optical fibers.

2. Description of the Prior Art

Glass fibers for optical communication are made from high purity, silica-based glass fibers drawn from glass preforms. Various glass deposition techniques are known for producing optical preforms which are then drawn into optical fibers. Some of these techniques, including vapor axial deposition (VAD) and outside vapor deposition (OVD), are based on flame combustion wherein reactants are fed together with combusting gases through a burner onto the growing preform. A porous glass preform is thus fabricated, which is then consolidated into a solid glass preform apt to being subsequently drawn into an optical fiber. According to other deposition techniques, such as modified chemical vapor deposition (MCVD) or plasma chemical vapor deposition (PCVD), the reactants are fed into a preformed glass tube, which is heated from the outside with a conventional combustion burner (MCVD) or with a plasma generating torch (PCVD); silica particles are deposited within the tube, thus forming the preform which is then drawn into an optical fiber.

The known combustion methods are based on the use of a flame burner to provide the energy for the reaction. Examples of the VAD process are disclosed, for example, in U.S. Pat. Nos. 5,597,398 and 4,915,717. Examples of the OVD process are disclosed in U.S. Pat. Nos. 3,806,570, 4,204,851, 4,596,589, and 4,810,276.

In the known combustion processes using burners (using either $H_2/O_2$ or $CH_4/O_2$ as combustion mixtures), silica particles are produced by a main oxidation reaction (1) of silica precursors and by a secondary reaction (2) involving flame hydrolysis of a silica precursor, according to the following mechanisms:

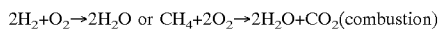
$2H_2+O_2 \rightarrow 2H_2O$ or $CH_4+2O_2 \rightarrow 2H_2O+CO_2$ (combustion)

$SiCl_4+O_2 \rightarrow SiO_2+2Cl_2$      (1)

$SiCl_4+2H_2O \rightarrow SiO_2+4HCl$      (2)

U.S. Pat. No. 4,414,164 discloses a low temperature hydrolysis process for fabricating silica preforms, which avoids the use of a flame burner, wherein silicon tetrachloride is reacted directly with water, according to the above reaction (2), in order to produce a silica preform.

Further techniques for producing a preform using flame-free techniques based on the above hydrolysis reaction are also known, as disclosed, for example, in U.S. Pat. Nos. 4,564,378, 4,597,983, 4,650,693, and 4,735,643. For instance, U.S. Pat. No. 4,564,378 discloses the reaction of a glass forming chloride gas (e.g. $SiCl_4$) with water. The formed silica particles are deposited onto a target contained into a reaction chamber, said target being cooled to a temperature of 20° C. to 800° C. (preferably 20°), while the surrounding reaction chamber is heated at a higher temperature, preferably about 1000° C. U.S. Pat. No. 4,597,983 teaches the use of an aerosol-free gas stream to envelope and convey an aerosol stream, formed by reaction of silica and water, to be deposited e.g. onto a bare like body. U.S. Pat. No. 4,650,693 teaches to heat said aerosol-free confining stream to a temperature which is higher than the temperature of the confined aerosol stream, in order to increase the confining effect of the aerosol-free gas. U.S. Pat. No. 4,735,643 teaches to add to the reacting mixture, e.g. gaseous $SiCl_4$ and water, at least one gas product of at least one of the gas phase reactants, for instance HCl, in order to avoid undesirable deposition of material at the point of entry of the reactants into the reaction chamber.

Although the above methods avoid some problems associated with other techniques where a flame hydrolysis is employed, the applicant has observed various drawbacks connected with these techniques.

For instance, it has been observed that too low temperatures of the reactants (e.g. silicium tetrachloride and water) may cause an incomplete hydrolysis reaction, and hydrated polymeric products may be generated in the final preform. These intermediate products may impair the quality of the final preform and cause nozzle obstruction.

On the other side, as disclosed by U.S. Pat. No. 4,735,643, high temperature of the reactant gases at the reactor inlet causes unwanted material deposition at the inlet.

The applicant has however noticed that the solution adopted in said patent, i.e. introduction of a reaction product (HCl, in the specific) into the reaction mixture entering the reaction chamber, causes an increase of the volume of gases entering the reaction chamber, with part of said volume not being at disposal for the glass forming reaction.

In addition, use of a confining gas stream around the reactants results in increased size and complexity of the apparatus.

SUMMARY OF THE INVENTION

The present invention relates to a method based on a hydrolysis reaction for producing an optical preform, wherein an increasing temperature gradient is provided between the inlet and the outlet zone of the reactor. In addition, according to the method of the present invention also the temperature of the target preform and/or the temperature of the reactants at the inlet of the reaction chamber is suitably controlled.

The hydrolysis reaction on which the method of the present invention is based is typically a flame-free hydrolysis, i.e. a reaction in which the process temperature can be precisely controlled, as opposed to conventional flame-hydrolysis wherein the temperature is hardly controllable within predetermined process parameters. Flame-free hydrolysis is thus generally performed in the substantial absence of combustibles, such as $CH_4$ or $H_2$.

A first aspect of the present invention thus relates to a method for manufacturing a glass preform by depositing an aerosol stream of glass particles onto a target, which comprises:

supplying a first gaseous or vapor phase composition disposed to provide a hydrolyzable glass precursor to an inlet zone of a reaction chamber;

supplying water as a second gaseous or vapor phase composition to said inlet zone of the reaction chamber;

reacting the water and the first gaseous or vapor phase composition in the reaction chamber to form an aerosol of glass particles;

directing the aerosol along said chamber and through an outlet of said chamber onto a target on which the preform is formed; and depositing the aerosol on the target, characterized in that a temperature gradient is provided inside of said chamber, said temperature gradient being such that the temperature increases from said inlet zone to said outlet of the reaction chamber.

According to a preferred embodiment, a difference of temperature of at least about 100° C. is provided from said inlet zone to said outlet of the reaction chamber, said difference of temperature preferably being of about 300° C. and up to about 800° C.

According to a further preferred embodiment, the temperature of the aerosol stream being directed through the reaction chamber increases from about 700° C. at the inlet to about 1200° C at. the outlet of said chamber.

According to an embodiment of the present invention, the water and the first gaseous or vapor phase composition are reacted in the substantial absence of an unreactive carrier gas. Preferably, the first and the second gaseous or vapor phase compositions are obtained by separately heating, under pressure, the first and second compositions, each contained as pure liquid in a respective supply tank.

According to a preferred embodiment of the present invention, the first and the second gaseous or vapor phase compositions are supplied at a predetermined temperature to the chamber, said predetermined temperature being a temperature at which the hydrolysis reaction between the two compositions is substantially incomplete. With the expression "substantially incomplete hydrolysis reaction," it is intended that the dimension of the silica particles produced by the reaction is sufficiently small in order to allow being transported by the gas stream without giving rise to unwanted deposition of material at the inlet of the reaction chamber, as observed in prior-an processes. In particular, said predetermined temperature is about 800° C. or lower, preferably from about 600° C. to about 750° C., a temperature of about 700° C. being particularly preferred.

According to a preferred embodiment, the temperature of the target preform on which glass particles are deposited is higher than about 700° C. Preferably, said target preform is maintained at a temperature which is lower than the temperature of the aerosol stream impacting on said preform. Preferably, the temperature of the target preform is at least 100° C. less than the temperature of the aerosol stream impacting on said preform.

A further aspect of the present invention relates to an apparatus for forming an elongated glass optical preform comprising:

a target onto which glass is deposited to form a preform;

an injection system for supplying a first gaseous or vapor phase composition and gaseous or vapor phase water to an inlet zone of a reaction chamber;

a reaction chamber in which the gaseous or vapor phase water and the first gaseous or vapor phase composition are reacted to form an aerosol of glass, said reaction chamber being provided with an outlet through which the aerosol of glass is directed toward the target;

a heating system associated with said reaction chamber, said heating system providing a temperature gradient inside said chamber, said temperature gradient being such that the temperature increases from said inlet zone to said outlet of the reaction chamber.

Preferably, said reaction chamber has a cross section which is convergent from an inlet zone to an outlet zone of the reactants.

In the present description, the expression "hydrolyzable glass precursor" is intended to indicate any suitable component or mixture of components able to react with water in order to create a glass. As the typical glass component is silica, a hydrolyzable precursor is thus typically a silicon compound (for instance silicon tetrachloride), which can be subjected to the hydrolysis reaction alone or in admixture with other glass precursors, such as the so-called doping agents, which comprise hydrolyzable compounds of Germanium, Boron, Phosphorus, Aluminum, Titanium, Zirconium and Fluorine.

The accompanying drawings, illustrate several embodiments of the invention and together with the description, serve to explain the principles of the invention.

DESCRIPTION OF THE PREFERRED EMBODIMENTS

Figure 1:
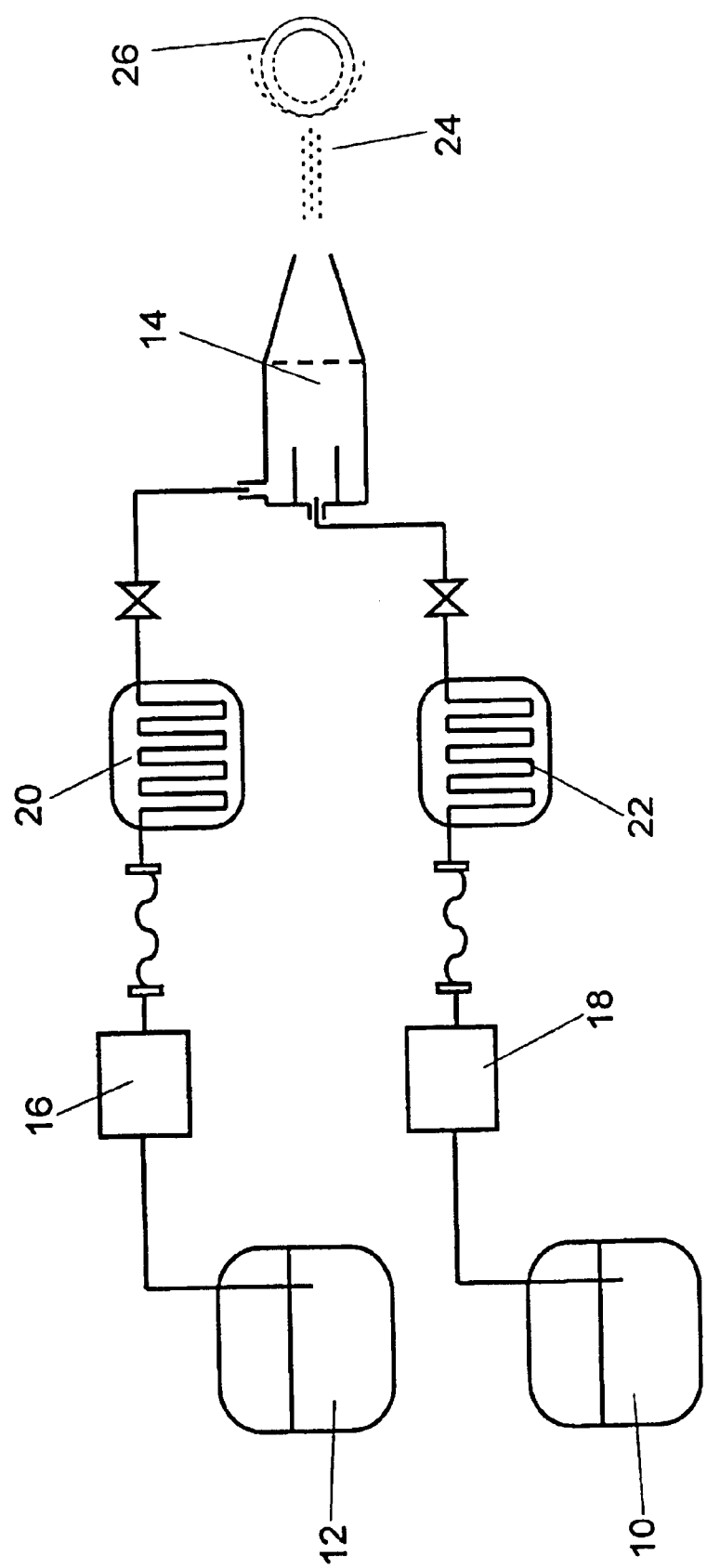
FIG. 1 is a schematic diagram of the reaction process flow.

FIG. 1 depicts an example of the overall reaction process flow.

Supply tanks 10 and 12, containing pure liquid reactants are heated under pressure, in order to vaporize the reactants. With reference to FIG. 1, said supply tanks are identified as tank 10, which contains a composition for providing the hydrolyzable glass precursor, e.g., $SiCl_4$, and tank 12 which provides water for the formation of water in the gaseous or vapor phase. The pure vaporized reactants are thus fed from tanks 10 and 12, heated separately in heaters 20, 22, and entered into the reaction chamber 14, where they mix and react, producing a silica glass aerosol (also referred to herein as a soot stream) 24 in accordance with the hydrolysis reaction (2) described above. As an alternative, reactants are fed from tanks 10,12 in liquid form and vaporized in vaporizing units 16 and 18, before being heated in heaters 20, 22. Silica soot impacts on the outer surface of a target, shown herein as mandrel 26, where it deposits. The mandrel 26 is preferably rotated for uniform deposition of the soot.

The deposition of silica particles onto the preform can be achieved either using a reactor having substantially the same length as the target preform (the "static process") or using a reactor which is traversed along the length of the target preform (the "dynamic process").

Figure 6:
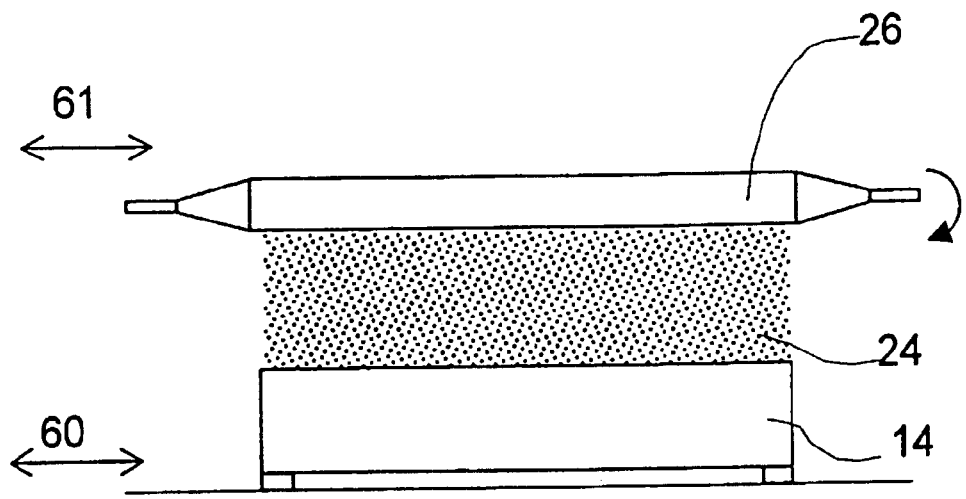
FIG. 6 is a schematic diagram depicting an embodiment of a stationary chamber in relation to a rotating target.

FIG. 6 schematically depicts a process of the static type, where the length of the reaction chamber 14 is approximately the same as the length of the target mandrel 26. The reaction chamber 14 has an elongated opening aligned with the longitudinal axis of the target preform, so that deposition occurs simultaneously along the whole length of target 26 on which the final porous body is formed. The reaction chamber may be stationary, or, in order to obtain better uniformity in axial properties of the final product, a limited relative movement between target and burner can be provided. To this purpose, either the target 26 or the reaction chamber 14 can be slightly oscillated in a longitudinal direction as indicated by arrows 60, 61. Target movement is preferred because this results in less flow perturbation. The injection system and reaction chamber geometry must enable uniform flow of reactants and silica soot deposition on the whole length of the target.

Figure 7:
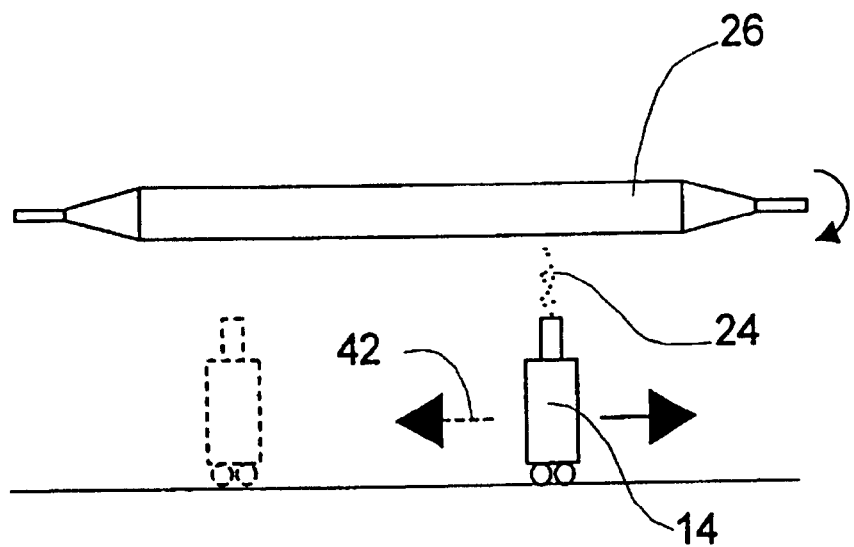
FIG. 7 is a schematic diagram depicting a translating chamber in relation to a rotating target.

FIG. 7 schematically depicts a process of the dynamic type, where the reaction chamber has a length substantially shorter than the target preform. Accordingly, a relative translating movement between the mandrel and the reaction chamber is provided along a path 42 parallel to the longitudinal axis of the mandrel 26. The reaction chamber 14 makes a number of passes with respect to the mandrel while the reaction chamber generates a stream of soot 24. The length of the mandrel 26 is traversed by a soot stream 24 emanating from the reaction chamber at a speed chosen to avoid a helical build-up on the surface of the mandrel. The translation speed is from about 500 mm/min to about 3000 mm/min, preferably around 750 mm/min. The translation speed may vary in the two opposite directions, for instance by moving the reactor in the first direction at the above speed for depositing soot particles, while moving it in the opposite direction at a higher speed ("fast return"), e.g. 6000 mm/min, without any substantial deposition of particles.

The preferred process of the present invention is based on the hydrolysis reaction of a hydrolyzable silica precursor (e.g. $SiCl_4$) with water.

The glass precursor must be hydrolyzable in order to produce a glass forming oxide via direct hydrolysis. In some embodiments of the present invention, the first gaseous or vapor phase composition consists essentially of $SiCl_4$. However, the present invention may also be advantageously used to make doped silica. In order to vary the physical parameters of the optical fiber, many dopant agents may be used in the deposition step (e.g. for varying the refractive index of pure silica). For instance, introduction of $GeO_2$ in the glass structure of the preform can be obtained by flameless hydrolysis of $GeCl_4$ or any other hydrolyzable $GeO_2$ precursor. Other suitable hydrolyzable precursors for introducing suitable dopants in the glass preform include, but are not limited to, $BCl_3$, $BBr_3$, $POCl_3$, $AlCl_3$, $TiCl_4$, $SiF_4$.

Combustionless hydrolysis can be used to easily form doped silica by direct reaction of a reactant mixture with water. Thus, a fully hydrolyzable compound is mixed with $SiCl_4$ and then reacted with water in gaseous phase to form doped soot. A typical example would be $GeCl_4$ mixed with $SiCl_4$ (in molar amount of, for instance, from about 1:100 to about 15:100) to form $SiO_2$—$GeO_2$ solid solution. Typical hydrolyzable reactants are metal halides $MX_n$ which can be used to introduce cations in the disordered silica lattice:

$$(1-x)SiCl_{4(g)} + xMX_{n(g)} + (2(1-x) + xn/2)H_2O_{(g)} \rightarrow \rightarrow Si_{(1-x)}M_xO_{2-x(2-n/2)(s)} + 4(1-x)HCl_{(g)} + xnHX_{(g)} \quad (3)$$

where x represents the mole fraction of the metal cation M (e.g. Germanium) introduced into the doped silica and X is halogen, preferably chlorine.

Figure 2:
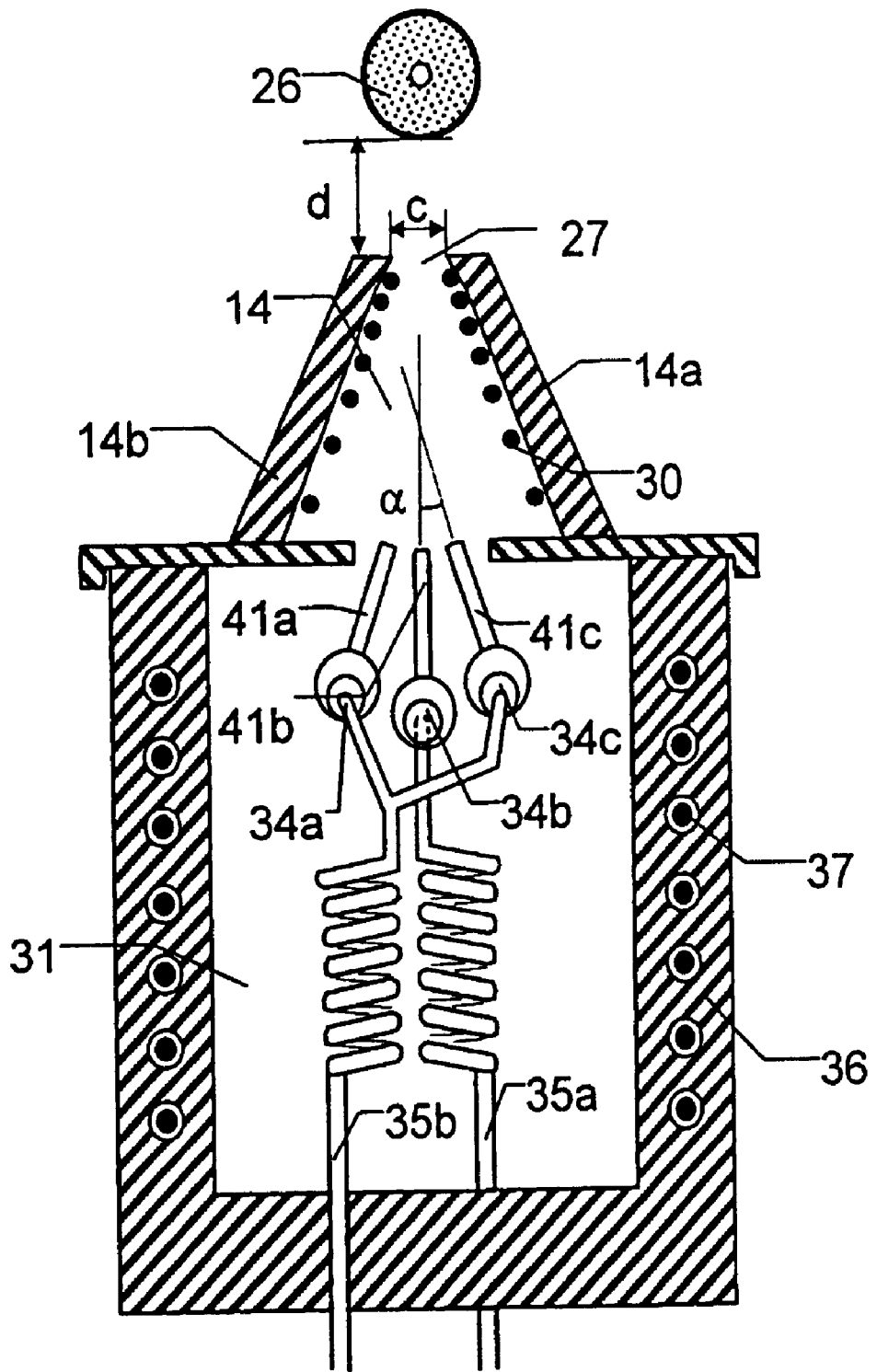
FIG. 2 is a drawing showing a cross-section of an apparatus according to the invention comprising an injection system and of a reaction chamber.
Figure 3:
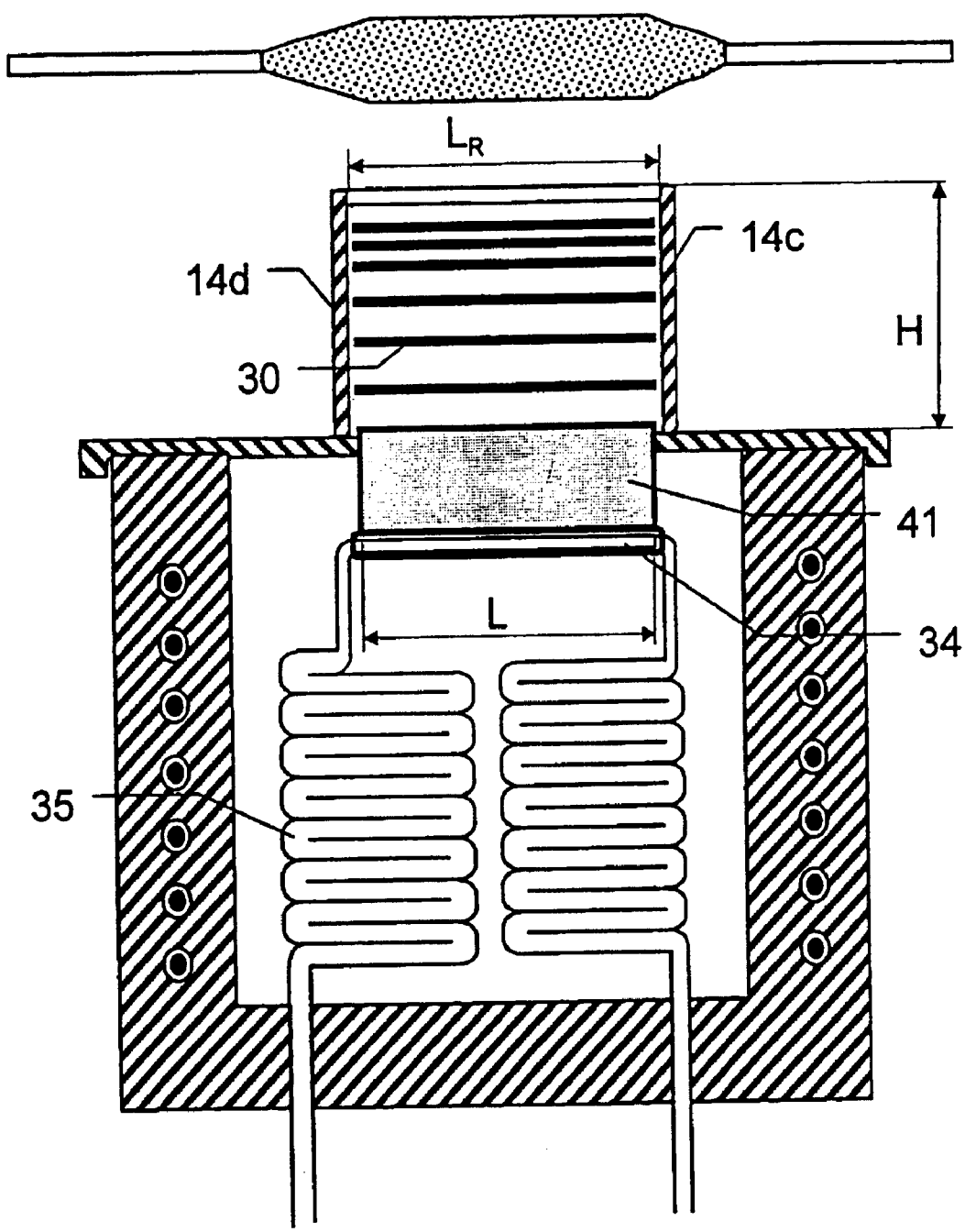
FIG. 3 is a drawing depicting a longitudinal section of the apparatus of FIG. 2.

With reference to FIGS. 2 and 3, an embodiment of a reactor according to the invention comprises an injection system 31 and a reaction chamber 14. The reaction chamber 14 is defined by converging side walls 14a, 14b and by end walls 14c and 14d. The distance "d" from the vapor outlet 27 of the reaction chamber to the target 26 is such that the target 26 is at a distance sufficient to permit the deposition of the glass particles from the aerosol of glass onto the target 26 to provide a glass soot preform. It should be however taken into account that the temperature of the aerosol impacting the target will generally decrease by increasing the distance from the reactor's outlet to the target preform. In preferred embodiments, this distance is from about 10 mm to about 100 mm, preferably of about 20–30 mm. The larger the preform diameter grows with the deposited soot, the less this distance between the upper part of the reaction chamber and the deposit becomes. To keep this distance constant, in order to maintain the same process parameters, a relative movement between the reactor and the mandrel may be provided.

Reactants, e.g., $SiCl_4$ and $H_2O$, are fed to the reaction chamber via one or more nozzles 41. In particular, the reactants are fed to an inlet zone of the reaction chamber, i.e. the bottom zone of the reaction chamber near the outlet of the nozzles.

In the arrangement shown in FIGS. 2 and 3, the injection system comprises three separate elements, each element comprising an injection chamber 34 (34a, 34b and 34c in FIG. 3) connected to a respective nozzle 41 (41a, 41b and 41c in FIG. 3), from which the reactant flows into the reactor chamber 14.

Figure 5:
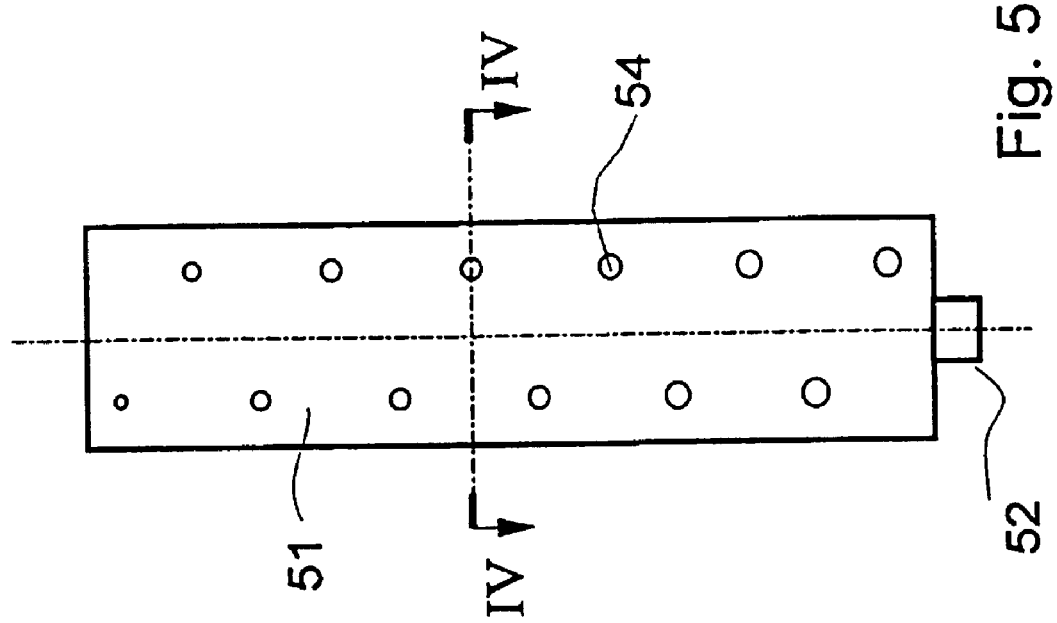
FIG. 5 is a drawing showing a cross-sectional view taken along lines IV—IV in FIG. 4 of the injection system of FIG. 4.
Figure 4:
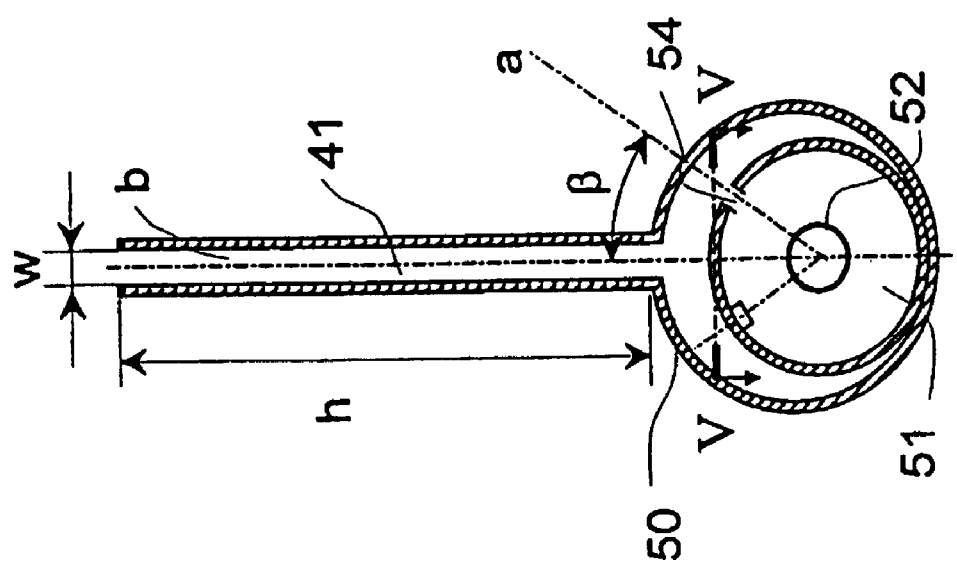
FIG. 4 is a drawing depicting a longitudinal section taken along lines V—V in FIG. 5 of an embodiment of the injection system.

As shown in detail in FIGS. 4 and 5, each element of the injection system comprises an injection chamber 34, wherein a first tubular member 51 is disposed inside a second tubular member 50. The tubular member 51 is provided with an inlet 52 through which the gaseous reactant is fed and is closed at the opposite end, while the tubular member 50 is closed at both ends. The tubular member 50 is provided with an elongated nozzle 41 for injecting the gaseous reactants into the reactor chamber. Said nozzle has preferably an elongated cross-section, with an elongated rectangular opening through which reactants are fed into the reaction chamber. The tubular member 51 is provided, on its upper half, with a series of holes 54. In order to provide flow uniformity, the dimensions of holes 54 preferably decrease from the inlet towards the opposite end of the tube. Said holes are disposed asymmetrically with respect to the axial direction of the injection system. As shown in FIG. 4, the axes "a" of the holes 54 preferably form an angle β with the axis "b" of the nozzle, which is from about 30 to about 60 degrees. When the gaseous reactant is fed through the inlet 52, it flows along the inner tubular member 51 and then, through holes 54, into the tubular member 50, from which it is injected, through nozzle 41, into the reactor chamber.

The dimension of holes 54, located in the tubular member 51, are selected in order to impart uniformity to the flow entering the first tubular member. For instance, their diameter may be gradually reduced, from about 2 mm close to the inlet of gas to about 1 mm at the opposite end. However, different dimensions and arrangements can be used, depending on the specific process parameters.

Reactants transported by pipes 35a and 35b (see FIG. 2), are thus fed into the respective injection chamber through the respective inlet 52.

As shown in FIGS. 2 and 3, the injection system is preferably housed into a container 36 which can be suitably heated, for instance by means of an electric resistance 37, to allow the reactants to reach the desired temperature before being injected into the reaction chamber.

Figure 10:
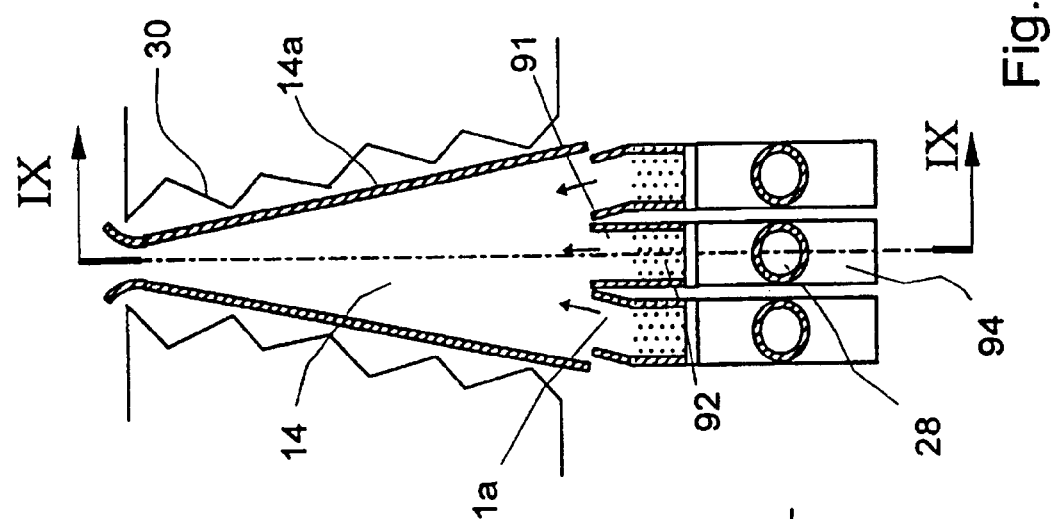
FIG. 10 is a schematic diagram showing a cross-sectional view taken along lines IX—IX in FIG. 9 of the injection system of FIG. 4 and of the reaction chamber.
Figure 9:
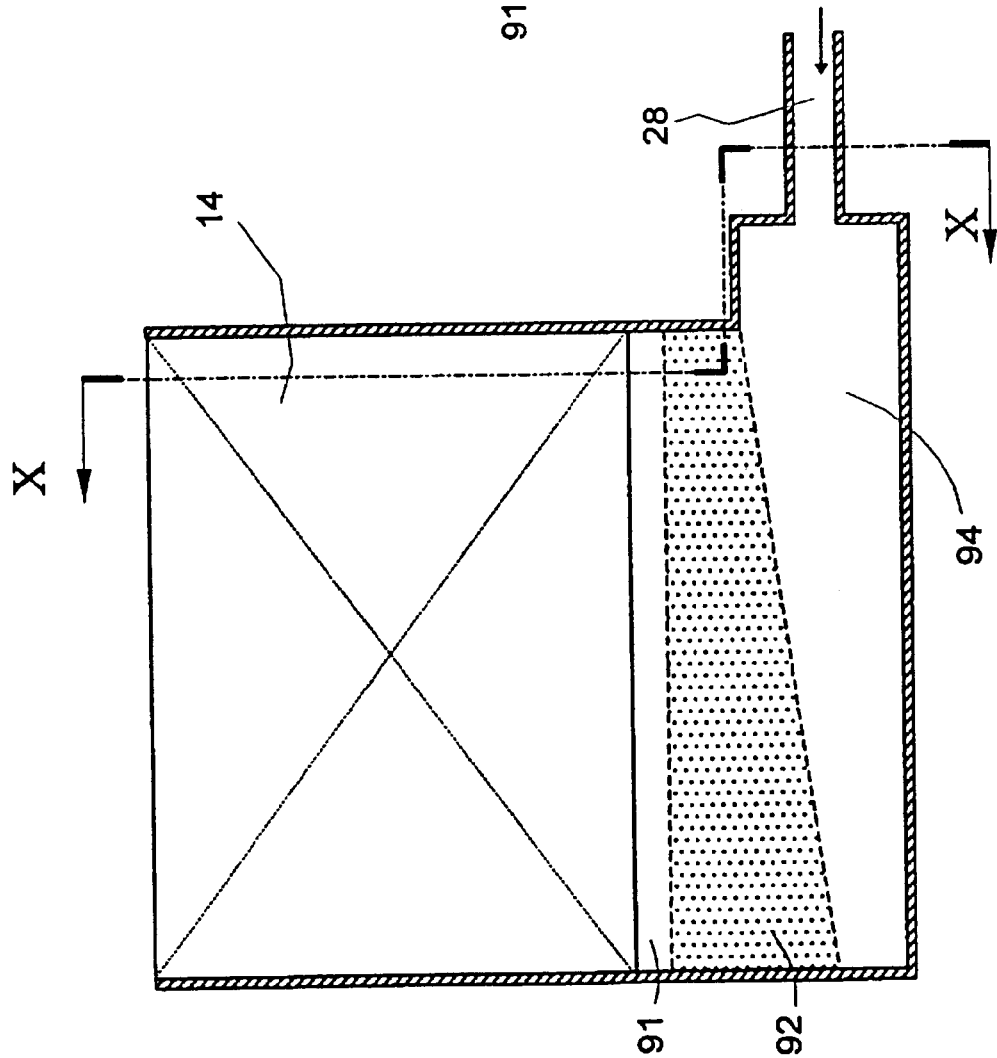
FIG. 9 is a schematic drawing depicting a longitudinal section taken along lines X—X in FIG. 10 of an alternative embodiment of the injection system.

According to an alternative embodiment, depicted in FIGS. 9 and 10, the injection chamber 94 can be a single chamber having a variable cross section, its dimensions being preferably decreasing from the reactants' inlet towards the opposite end. Said injection chamber is then connected to its respective nozzle 91 through a porous element 92, for instance made of porous ceramic material. The variable section of the chamber and the presence of the porous element allow the control of the vapor flow in the injection system and to the reaction chamber 14, by imparting uniformity and a substantially constant vertical upward velocity component to the flow.

The walls of the reaction chamber 14, as well as the container of the injection system, can be made from ceramic materials, preferably from $Al_2O_3$, while the injection system can be made from quartz, but also metallic materials (e.g. stainless steel) can be used, in particular when the temperature of the injection system is kept below about 800° C.

As shown if FIGS. 2–3, the reactants, for example $SiCl_4$ and $H_2O$, are conducted through the injection system 31, designed to achieve longitudinal stream uniformity, and are maintained in separate streams until they are introduced into the inlet zone of the reaction chamber 14.

As previously mentioned, the nozzles will preferably have an elongated cross section. The length "L" of nozzles 41 (see FIG. 3) depends on the desired length of the soot to be deposited on the target and can be easily determined by one skilled in the art. For instance, in practicing the present invention, a length of from about 20 mm to about 240 mm has been used. The height "h" of the nozzles 41 (see FIG. 4) will be such as to allow the gas flowing from the injection chamber into the reaction chamber to reach a substantial laminar flow. For instance, this height can vary from about 30 to about 80 mm, a height of about 50 mm being the one adopted in practicing the example of the present invention.

A longitudinal opening through which reactants flow into the reaction chamber is provided on the nozzle 41, said opening having a width "w", as shown if FIG. 4. Preferably, the width "w" is from about 1 mm to about 4 mm, a width of about 1.5 mm being the one adopted in practicing the example of the present invention.

Either $H_2O$ or $SiCl_4$ may be fed to the central nozzle 41b. According to a particular preferred embodiment, $SiCl_4$ is fed to the central nozzle, while water is fed to the two side nozzles. Preferably, the side nozzles 41a and 41c are angled toward one another to increase mixing of the reactant streams, for instance by an angle of about 15° with respect to the axis of the central nozzle. For maintaining the desired 1:2 stoichometric ratio with water, the flow rate of water will preferably be about twice the flow rate of $SiCl_4$. A preferred speed of the gases entering the reaction chamber is from about 1 to about 2.5 m/s. In order to obtain comparable outlet velocity, the nozzles for injecting water preferably have a total cross section which is about twice the total cross section of $SiCl_4$ nozzles. Thus, if only two nozzles are used, one for $SiCl_4$ and one for water, the second one will have a cross section twice the cross section of the first one. If an arrangement with three nozzles according to FIG. 2 is used, e.g. the central one for $SiCl_4$ and the two side nozzles for water, then the three nozzles will all have approximately the same cross section.

Various other nozzle designs may be provided based on the specific deposition conditions.

For instance, circular nozzles may be employed, in particular for use in the static type process. The simplest circular design may consist of two coaxial tubes, wherein one reactant (e.g. silicon tetrachloride) is fed to the central tube and the second one (e.g. water) to the annular space between the tubes. Alternatively, a circular design consisting of three or more coaxial tubes may also be used. Cross sectional areas are calculated to obtain comparable flow rates for the two reactants.

Figure 12:
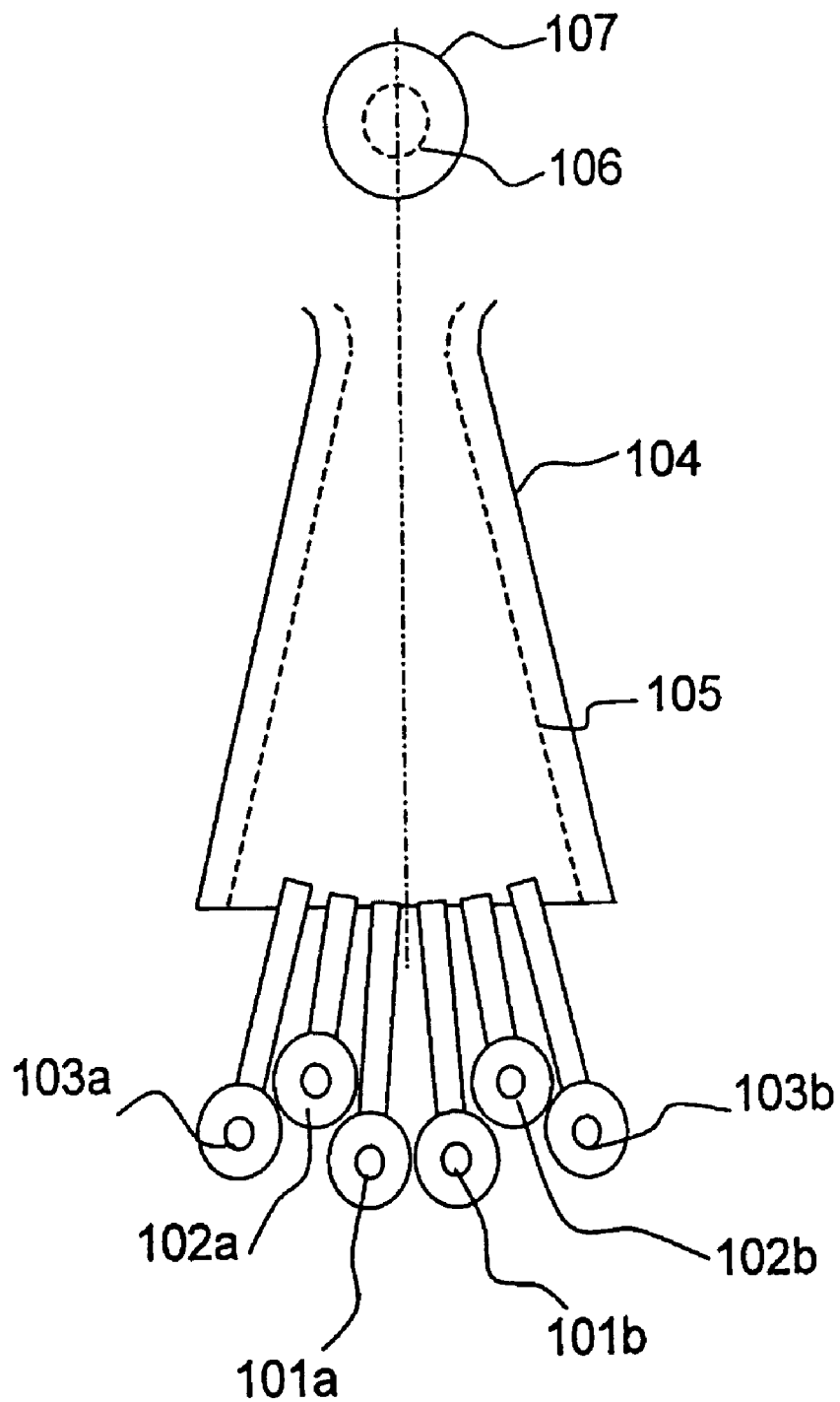
FIG. 12 is a schematic representation of a multiple nozzles injection system.

In addition, multiple nozzles designs may be used, either with circular or, preferably, with an elongated cross-section, to create a modular reactor, for use in both static or dynamic deposition process. The multiple nozzles are activated as the process goes on. In the first phase of the process, when relatively little soot has been deposited from the soot stream, mandrel diameter is small and a large soot stream does not impact completely onto the target and is partially lost, with a corresponding loss of deposition yield. On the other hand, the larger the preform diameter grows with the deposited soot, the more advantageous a large soot stream becomes. For instance, when using an array of injection nozzles with elongated cross-section (as the one depicted in FIG. 4), a six nozzles injection system can be used, wherein the nozzles are disposed parallel to each other, as illustrated in FIG. 12. At the beginning of the deposition process only the two central nozzles 101a and 101b are activated (one being fed with a hydrolyzable composition and the other one with water), in order to produce an initial soot stream with a width compatible with the initial dimensions of the target preform, depicted by the dotted circle 106. As the diameter of the preform increases, e.g. to the diameter 107, the outer nozzles are subsequently activated (first nozzles 102a and 102b and then nozzles 103a and 103b), while also the width of the opening "c" of the reaction chamber is increased accordingly, from the dimensions indicated by the dotted line 105 to the dimensions indicated by the continuous line 104.

As shown in FIG. 3, nozzles 41 connect each injection chamber to the inlet zone of the reaction chamber 14 where reactants mix. The length of the reaction chamber "$L_R$" is suitably dimensioned with respect to the length of the injection nozzles. For instance, the length of the chamber may be from about 10 to about 30 mm more than the length of the injection nozzles, in both the static or dynamic deposition processes. Alternatively, the reaction chamber can be substantially longer with respect to the injection nozzles. For instance, the reaction chamber may have substantially the same length as the target preform, e.g. about one meter, while the injection nozzles will be shorter, e.g. about 20 cm. In this case, the reaction chamber can remain stationary with respect to the target preform, while the injection nozzles are traveled inside the chamber along the whole length of the preform.

The reaction chamber will have a height "H" sufficient to allow an adequate mixing of the reactants in order to react them and achieve the desired particles' dimensions for deposition onto the target. Typically, by increasing the amount and speed of the reactants entering into the reaction chamber, the height of it will consequently be increased. The height "H" of the reaction chamber may thus typically range from about 30 mm to about 200 mm.

The width of the opening "c" of the reaction is set to suitably direct the gas/soot stream onto the target preform, being preferably adjustable with the increasing dimensions of the growing preform. For instance said opening may have a width of from about 10 to about 30 mm.

Advantageously, the temperature at the outlet of the injection nozzles, and therefore the temperature of the reactants entering the reaction chamber 14, is maintained below a predetermined temperature so that the hydrolysis reaction is substantially incomplete. In particular the applicant has observed that below said predetermined temperature, the dimension of the silica particles produced by the reaction is sufficiently small in order to being transported by the gas stream without giving rise to unwanted deposition of material at the inlet of the reaction chamber, as observed in prior art processes.

The applicant has observed that unwanted deposition of glass particles can be avoided by preferably operating at a temperature of the reactants below about 800° C., preferably below about 750° C. However, it is desirable to have a sufficiently high temperature of the reactants at the inlet of the reactor chamber, so to allow an efficient use of said reactor. Advantageously, the temperature of the reactants entering the reaction chamber 14 can be set at least at about 400° C., preferably from about 600° C. to about 750° C., a temperature of about 700° C. being particularly preferred.

If desired, in order to further reduce the risk of glass particles deposition at the outlet of the nozzles, it is possible to provide the injection system with additional nozzles (not shown), arranged in-between nozzles 41a–41b and 41b–41c. Said additional nozzles are fed with a buffer of inert gas (Ar or $N_2$), in order to keep the reactant flows separate and to shift the mixing point of said reactants sufficiently away from the nozzles outlet, in a zone of the reactor where the possible formation of glass particles of certain dimensions does not give rise to deposition problems. It is apparent that the use of such an injection arrangement will allow to increase the temperature of the reactants entering the reaction chamber 14 above the temperature at which a substantial hydrolysis reaction occurs, for instance at about 1200° C.

Heating elements 30, e.g. an electric resistance, are provided along the reaction chamber in order to heat the aerosol stream up to a temperature effective to obtain deposition of the glass particles onto the target 26.

Although not wishing to be bound by any particular theory, it can be noticed that the mechanism directing the movement of soot onto the target appears to be partially governed by thermophoresis, i.e. the tendency of soot particles in a hot stream of gas to be propelled towards lower temperature regions.

As a matter of fact, owing to the small size of the glass soot particles to be deposited, they would tend to follow the gas stream lines, flowing around the target preform. Accordingly, the collection only by impaction of said particles onto the growing preform could be somehow difficult. On the other hand, by providing a thermal gradient between the target preform and the glass soot stream, in particular when the soot stream has a higher temperature than the preform, the particles from the soot stream are directed by a thermophoretic force toward the target, thus increasing the amount of deposited particles onto said target. The thermophoretic force on a particle, and hence the thermophoretic speed it acquires, is proportional to the temperature gradient.

Typically, by increasing the difference of temperature between soot stream and preform generally results in increased deposition of glass particles onto the preform.

Due to the complex mechanisms of reaction, involving a heterogeneous growth of silica particles from gas phase to a soot structure, specific temperature conditions are thus needed to obtain a product with microstructure and morphology suitable for preform fabrication. In particular, the applicant has noticed that, in order to achieve morphological characteristics similar to those observed for the soot produced by conventional combustion techniques (such as OVD and VAD), the temperature of the impacting soot stream should preferably be above 700° C.

For enhancing the thermophoretic effect between depositing glass particles and target preform, a target's temperature lower than the above temperatures of the reacting soot stream would be desirable. The applicant has however observed that, in order to keep the deposited soot robust enough to sustain its own weight and handling the glass preform in further production process steps, the temperature of the preform should preferably be maintained high. In particular, the temperature of the preform should be kept at about 700° C. or higher, preferably above about 800° C. and up to about 1200° C.

In order to increase the thermal gradient between particles and target for improving the thermophoretic effect, the temperature of the reacting soot stream close to impacting the preform should preferably be at least 100° C. higher than the temperature of the preform. Accordingly the temperature of the soot stream impacting the preform should be set at a temperature higher than about 800° C., preferably above about 900° C., up to about, for instance, 1800° C. Preferably, the temperature of the reacting soot stream close to impacting the preform is from about 1000° C. to about 1500° C.

Figure 11B:
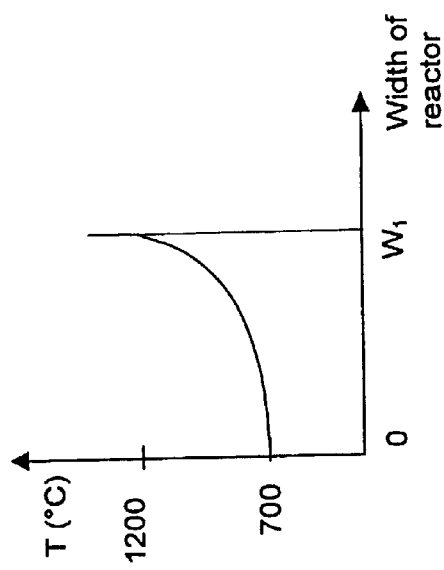
FIGS. 11a, 11b and 11c show the longitudinal and transversal temperatures profiles of the chamber of FIG. 11.
Figure 11C:
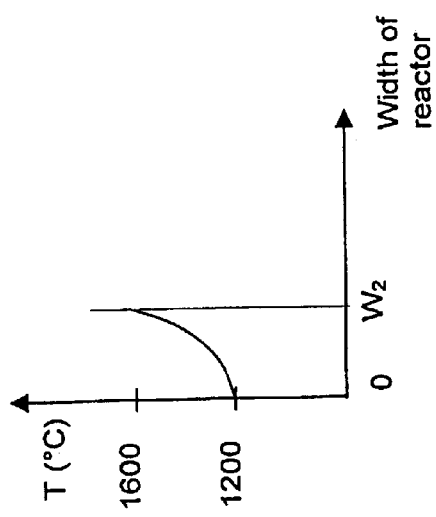

FIG. 3 shows a preferred embodiment of the reaction chamber 14, having a convergent cross section. The reaction chamber is designed to have a convergent cross section so that reactant vapors mix easily with each other and the glass soot stream which forms is directed through opening "c" toward the target 26. By using suitable heating elements 30, but avoiding flame, it is possible to have better control over temperature profiles in the system. Using a controlled temperature profile in the system (as depicted in FIGS. 11a–11c), the glass particles formed in the reaction chamber are directed toward the growing preform also by thermophoretic forces. The heating elements may be any conventional devices as are well known in the art, for instance a furnace, such as an electrical furnace or an induction furnace. The temperature gradient may be generated as shown in FIGS. 2 and 3, by using an array of electrical resistances 30 in contact with the reactor wall, preferably arranged with decreasing distance from each other from the bottom to the upper part of the reaction chamber.

By effect of the heating elements surrounding the reaction chamber, suitably disposed to generate increasing temperatures from the inlet of the reaction chamber in the direction of the preform, a gradient of temperature in the longitudinal direction of the reaction chamber is thus generated. The applicant has observed that for avoiding possible particles deposition onto the reactor's walls, a difference of temperature of at least 100° C. should be provided from the inlet to the outlet zone of the reaction chamber. However, while reactants are preferably fed into the reaction chamber at about 700° C.–750° C., their temperature at the outlet of said chamber should be preferably set at least at about 1000° C., preferably about 1200°–1500° C., in order to create the desired thermal gradient between impacting particles and target preform.

Thus, the difference of temperature along the height of the reaction chamber, in particular along its converging walls, should be at least of about 300° C., preferably of about 400° C. and up to about 800° C., in order to impart the desired temperature to the soot/gas stream at the outlet of the reactor chamber, while avoiding undesired deposition of particles on the reactor's walls.

The heating elements disposed to surround the reactor chamber generate in addition a difference of temperature in the transversal direction of the reactor chamber, with temperatures decreasing from the walls towards the center of the chamber, where the gas/soot stream should be confined. Again, the applicant has observed that a difference of temperature in the transversal direction of at least 100° C. should be maintained for avoiding particle deposition on reactor's walls. Nevertheless, in order to increase the heating of the soot/gas stream moving towards the target preform and to increase the thermophoretic confining effect, said transversal temperature difference is preferably maintained above about 300° C. along the whole height of the reactor, up to, for instance, 600° C.

When practicing the present invention, typical distribution of temperatures from the bottom towards the upper part of the reactor chamber can be from about 1200° C. to about 1600° C. on the walls, while in the central part of the chamber, where the soot/gas stream is confined, the temperature may vary from about 700° C. to about 1200° C.

Figure 11:
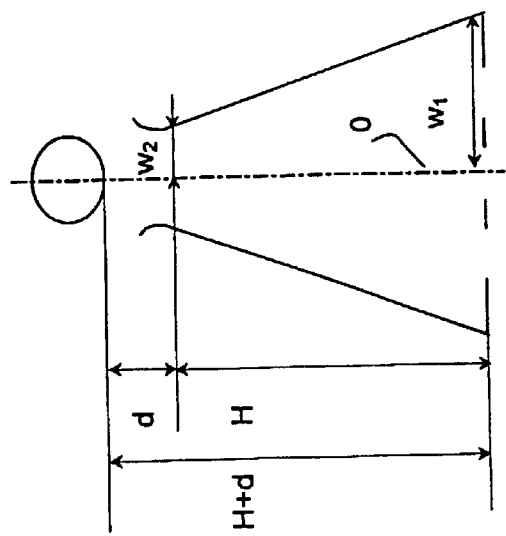
FIG. 11 is a schematic diagram of a reaction chamber according to the invention.
Figure 11A:
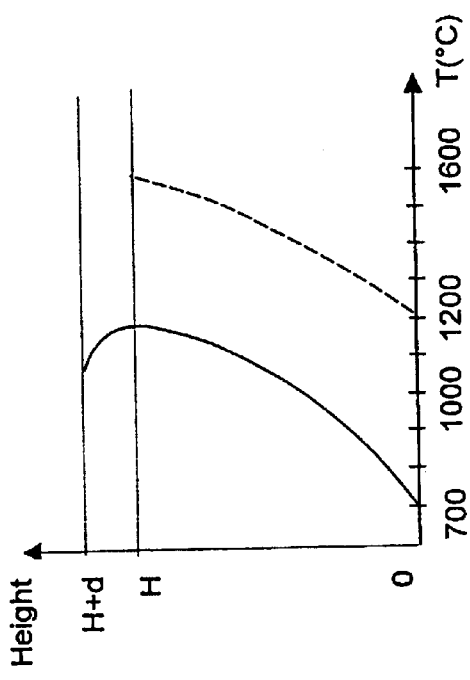

FIGS. 11a to 11c shows an example of the temperature profiles with reference to the schematic drawing of FIG. 11, and to the above given differences of temperature.

In particular, in FIG. 11a, the continuous line shows the thermal profile of the soot stream in the central part of the reactor (up to height H), and then from the reactor outlet to the surface of the target preform (distance "d"). As it can be appreciated, the temperature of the soot stream raises from about 700° C. at the inlet zone of the reactor, up to about 1200° C. at the outlet of the reactor. The temperature of the soot stream then decreases down to a temperature of about 1000° C. which is the temperature of the soot stream impacting the preform (which is in turn preferably kept at a temperature of about 850° C.). The dotted line in FIG. 11a depicts the thermal profile in correspondence of the walls of the reactor chamber, where the temperature raises from about 1200° C. to about 1600° C.

FIGS. 11b and 11c, show the profiles of temperature in the transversal direction at different heights of the reaction chamber. In particular, according to FIG. 11b, the temperature at the inlet zone of the chamber (having a width "$w_1$") increases from about 700° C. in the central part ("0" axis) to about 1200° C. on the walls of the chamber. According to FIG. 11c, the temperature at the outlet of the chamber (having a width "$w_2$") increases from about 1200° C. in the central part to about 1600° C. on the walls of the chamber.

The combination of these two temperature gradients causes the stream of gas and particles to be confined in the central part of the reactor, avoiding deposition on the perimeter walls of it. As a matter of fact, the soot/gas stream being transported towards the deposition target tends to increase its temperature (from an initial temperature of, for example, 700° C.), as a consequence of the heating generated by the exothermic hydrolysis reaction and by the heating elements. If the temperature of the inner walls of the reactor chamber is kept constant along its whole length (e.g., at about 1000° C.), it may happen that the glass particles reach temperatures comparable to those of the reactor's walls, with possible deposition of said particles onto said walls. If the inner walls of the reactor are instead subjected to a controlled longitudinal thermal gradient (e.g., with a temperature variation from about 1200° C. to about 1600° C.), the particles transported in the stream will encounter subsequent zones of the reactor wherein the transversal gradient is suitably set in order to have a temperature of the wall substantially higher than the temperature of the glass particles contained in the stream. Accordingly, said particles will be subjected to thermophoretic repulsion forces generated by the walls having a higher temperature, which will tend to confine them in the central part of the reactor for the whole height of it, thus avoiding the unwanted deposition onto the reactor's walls.

In the preferred embodiment of the process and apparatus of the present invention, the gaseous or vapor phase reactants pass through the system and are reacted in the substantial absence of carrier gases, e.g., in the absence of conventional unreactive carrier gases such as nitrogen, argon, and the like.

Figure 8:
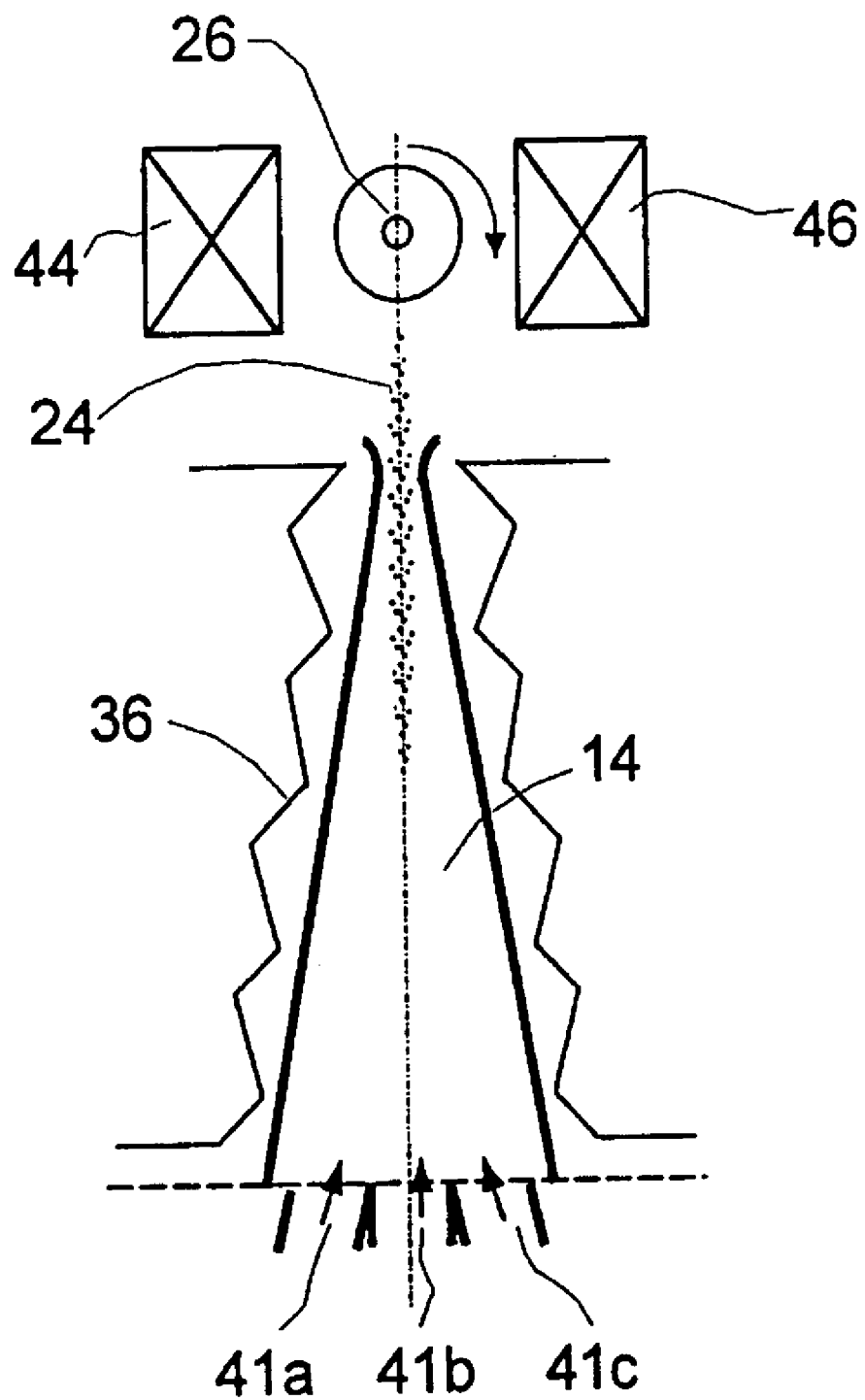
FIG. 8 is a schematic drawing depicting the reaction chamber and the target with the respective heating elements.

FIG. 8 depicts an example wherein the temperature of the soot stream and the temperature of the preform are independently controlled by additional heaters 44, 46. This arrangement permits control of the thermal gradient as well as an increase in deposit temperature.

Other arrangements of the additional heaters are possible. In some cases it may be advantageous to use a heater on only one side of the preform, depending on rotation direction. In this way, the deposited soot layer is heated and thus partially sintered in order to get a robust final product and, at the same time, the target has time to cool while rotating to create a thermal gradient with the soot stream. If desired, a heater with a circular cross section may be arranged around the preform mandrel to provide for uniform heating of the preform.

The obtained porous preform is then dehydrated and consolidated according to known techniques, such as those described in U.S. Pat. No. 3,933,454 in order to produce a solid glass preform which is then drawn to obtain an optical fiber.

It is to be understood that, although the method and apparatus of the invention has been described with specific reference to an OVD-like deposition process, the method of the present invention can be applied, with the suitable modifications known to those skilled in the art, also for other deposition techniques, such as, for instance, in a VAD-like deposition process.

EXAMPLES

Experiments using quartz reactors were carried out in order to test both the dynamic and the static process. Twenty-six tests were performed, 5 of them to test the dynamic process (1d to 5d) and 21 to test the static process (1s to 21s). For dynamic process a reactor translation speed of 750 mm/min in both directions was applied, obtaining preforms of about 700 mm length. Results of tests for the dynamic and static process are reported in table 1 and 2, respectively.

Without using any carrier gas, reactants were vaporised in pressurised tanks and fed to the reaction chamber. Temperature in each tank was kept above boiling point of the single reactant.

The reactor employed for the tests is as described in FIGS. 2 and 3. Reactants adduction pipes and injection chamber were inserted in an oven able to provide a temperature of the reactants entering in the reaction chamber of about 700° C. The height "h" of the injection nozzles was about 50 mm. Reaction chambers with different heights were employed during tests, in order to evaluate different thermal profiles.

The height "H" of the chamber employed for each test is reported in tables 1 and 2. An array of electric resistances suitably spaced apart from each other, in order to provide the desired temperature profile into the chamber, was disposed inside the reaction chamber. Different intensity of heating has been applied in order to vary gas temperature and target temperature. In this way it was possible to evaluate the influence of the temperature and the thermal gradient on the deposition rate and yield.

A mandrel of 10 mm diameter and 1500 mm length was provided as soot target. It was rotated at a rotational speed of 50 rpm. A constant distance "d" of about 30 mm between the upper part of the reaction chamber and the deposit was maintained during the deposition process by lowering the reactor. The opening "c" at the outlet of the reaction chamber has been set at 10 mm.

For the dynamic process, only one reactor with two nozzles having a length L of 20 mm has been tested. For the static process, as reported in table 2, four different length "L" of the nozzles were considered: 20 mm, 50 mm, 150 mm, 240 mm. Both 20 mm and 50 mm reactors included two nozzles, one for each reactant, while 150 mm and 240 mm reactor included three nozzles: a central one for silicon containing compound and two external ones for water. In both cases, the two external nozzles were angled at about 15° with respect to the longitudinal axis of the reactor. In all tests, the reaction chamber was about 20 mm longer than the nozzles contained therein (about 10 mm for each side).

The silicon containing compound used during tests was $SiCl_4$. A $SiCl_4$:$H_2O$ ratio of 1:2 was used in all tests, in order to obtain stoichometric ratio between the reactants. In order to obtain comparable outlet speed $H_2O$ nozzle total cross section was twice the size of $SiCl_4$ nozzle cross section. In particular, in the three nozzles arrangement, each nozzle was provided with a longitudinal clearance of about 1.5 mm, while in the two nozzles arrangement, the longitudinal clearance of the water's injection nozzle was about 3.0 mm, twice the clearance of the $SiCl_4$ nozzle.

During each test, the temperature of the soot stream impacting the preform (Tb) and the temperature of the preform (Ta) were measured. These values, as well as their difference (Tb−Ta) are reported for each test in tables 1 and 2.

For each test a parameter called Comparative Efficiency (hereinafter referred as CE) was introduced to combine the effects of deposition rate and yield. In order to evaluate the relative influence of process parameters, as temperature profile, reactant velocities, reactor and reaction chamber geometry, the comparative efficiency for test #1 was set to one, as reference. Values for all the other tests are referred to 1.

TABLE 1

Test results of dynamic process

| Test | Reactor Length (mm) | Height (mm) | Tb − Ta (° C.) | Ta (° C.) | Tb (° C.) | CE |
|---|---|---|---|---|---|---|
| 1d | 20 | 0 | — | — | — | 0.79 |
| 2d | 20 | 50 | 20 | 780 | 800 | 6.26 |
| 3d | 20 | 50 | 80 | 780 | 860 | 4.46 |
| 4d | 20 | 80 | 200 | 740 | 940 | 10.34 |
| 5d | 20 | 80 | 100 | 810 | 910 | 5.90 |

TABLE 2

Test results of static process

| Test | Reactor Length (mm) | Height (mm) | Tb − Ta (° C.) | Ta (° C.) | Tb (° C.) | CE |
|---|---|---|---|---|---|---|
| 1s | 20 | 0 | — | — | — | 1.00 |
| 2s | 20 | 0 | — | — | — | 0.37 |
| 3s | 50 | 45 | 230 | 660 | 890 | 15.47 |
| 4s | 50 | 45 | 190 | 680 | 870 | 8.72 |
| 5s | 50 | 45 | 160 | 700 | 860 | 5.61 |
| 6s | 150 | 100 | 100 | 730 | 830 | 9.03 |
| 7s | 150 | 100 | 100 | 800 | 900 | 9.37 |
| 8s | 150 | 100 | 60 | 840 | 900 | 4.90 |
| 9s | 150 | 100 | 180 | 800 | 980 | 13.61 |
| 10s | 150 | 100 | 220 | 700 | 920 | 17.30 |
| 11s | 150 | 100 | 280 | 710 | 990 | 13.87 |
| 12s | 150 | 100 | 150 | 830 | 980 | 11.69 |
| 13s | 150 | 130 | 400 | 700 | 1100 | 20.40 |
| 14s | 150 | 130 | 130 | 970 | 1100 | 5.15 |
| 15s | 150 | 130 | 250 | 800 | 1050 | 13.80 |
| 16s | 240 | 100 | 100 | 900 | 1000 | 3.46 |
| 17s | 240 | 100 | 220 | 880 | 1100 | 19.62 |
| 18s | 240 | 100 | 280 | 750 | 1030 | 24.00 |
| 19s | 240 | 100 | 400 | 700 | 1100 | 27.34 |
| 20s | 240 | 100 | 380 | 590 | 970 | 39.54 |
| 21s | 240 | 100 | 440 | 530 | 970 | 37.65 |

As it can be appreciated from tables 1 and 2, the CE of tests carried out without using any reaction chamber (reported as height=0 in tables 1 and 2), are extremely low in comparison to that of the other tests. This behaviour is connected to the fact that without a reaction chamber, the reaction occurs at low temperature and soot particles are not heated enough to grow and to guarantee the thermal gradient needed to achieve high deposition rates.

Although both deposition methods can be used in order to obtain high CE, by comparing the results of table 1 and table 2, it can be appreciated that tests carried out with translation of the reactor show a lower CE with respect to tests performed in similar process conditions as for the static process.

Another observation on the results of table 1 and 2 is that the CE value generally increase with the increase of the thermal gradient (Tb−Ta).

As a last consideration on these results, it can be observed that an increase of the CE value can generally be obtained by increasing the length of the reactor.

In tests 20s and 21s, although good results in term of CE were obtained, the low temperature of the target preform during deposition resulted in a final preform which was difficult to handle for the subsequent treatments, due to the relatively poor consistency of the deposited soot.

What is claimed is:

1. A method for manufacturing a glass perform, comprising:
   supplying a first gaseous or vapor phase composition to a reaction chamber, wherein the first gaseous or vapor phase composition is disposed to provide a hydrolyzable glass precursor;
   supplying water as a second gaseous or vapor phase composition to the reaction chamber;
   reacting the water and the first gaseous or vapor phase composition in the reaction chamber to form an aerosol of glass particles;
   providing a temperature gradient to walls of the reaction chamber, wherein according to the temperature gradient, a temperature of the walls increases in a direction of a flow of the aerosol along the reaction chamber;

directing the aerosol along the reaction chamber, out of the reaction chamber, and toward a target; and depositing glass particles of the aerosol onto the target.

2. The method of claim 1, wherein a temperature of the walls of the reaction chamber is greater than or equal to about 1,200° C.

3. The method of claim 1, wherein a temperature of the walls of the reaction chamber is less than or equal to about 1,600° C.

4. The method of claim 1, wherein a temperature of the walls of the reaction chamber is greater than or equal to about 1,200° C. and less than equal to about 1,600°.

5. The method of claim 1, wherein the aerosol comprises a first temperature at a time of formation of the aerosol, and
wherein the first temperature is about 700° C.

6. The method of claim 1, wherein the aerosol comprises a second temperature as the aerosol is directed out of the reaction chamber, and
wherein the second temperature is about 1,200° C.

7. The method of claim 1, wherein a temperature of the aerosol in the reaction chamber is greater than about 700° C. and less than about 1,200° C.

8. The method of claim 1, wherein the aerosol comprises a first temperature at a time of formation of the aerosol,
wherein the aerosol comprises a second temperature as the aerosol is directed out of the reaction chamber, and
wherein the second temperature is greater than the first temperature by at least about 100° C.

9. The method of claim 1, wherein the aerosol comprises a first temperature at a time of formation of the aerosol,
wherein the aerosol comprises a second temperature as the aeroesol is directed out of the reaction chamber, and
wherein the second temperature is greater than the first temperature by about 300° C.

10. The method of claim 1, wherein the aerosol comprises a first temperature at a time of formation of the aerosol,
wherein the aerosol comprises a second temperature as the aerosol is directed out of the reaction chamber, and
wherein the second temperature is greater than the first temperature by about 500° C.

11. The method of claim 1, wherein a temperature of the first gaseous or vapor phase composition supplied to the reaction chamber is below a predetermined temperature, and
wherein a temperature of the second gaseous or vapor phase composition supplied to the reaction chamber is below the predetermined temperature.

12. The method of claim 11, wherein the predetermined temperature is a temperature at which a hydrolysis reaction between the first and second gaseous or vapor phase composition is substantially incomplete.

13. The method of claim 11, wherein the predetermined temperature is less than about 800° C.

14. The method of claim 11, wherein the predetermined temperature is greater than or equal to about 600° C. and less than or equal to about 750° C.

15. The method of claim 11, wherein the predetermined temperature is about 700° C.

16. The method of claim 1, wherein a temperature of the target is greater than about 700° C.

17. The method of claim 1, wherein a temperature of the target is greater than about 800° C.

18. The method of claim 1, wherein a temperature of the target is less than a temperature of a stream of the aerosol impacting the target.

19. The method of claim 1, wherein a temperature of the target is at least 100° C. less than a temperature of a stream of the aerosol impacting the target.

20. The method of claim 1, wherein a temperature of a stream of the aerosol impacting the target is greater than or equal to about 800° C.

21. The method of claim 1, wherein a temperature of a stream of the aerosol impacting the target is greater than or equal to about 900° C.

22. The method of claim 1, wherein a temperature of a stream of the aerosol close to impacting the target is greater than or equal to about 1,000° C. and less than or equal to about 1,500° C.

23. The method of claim 1, wherein the reaction chamer comprises convergent walls, and
wherein the aerosol is directed toward the target by the convergent walls.

24. The method of claim 1, wherein the first and second gaseous or vapor phase compositions are reacted in a substantial absence of an unreactive carrier gas, an aerosol-free gas stream, or an unreactive carrier gas and an aerosol-free gas stream.

25. The method of claim 1, further comprising:
shifting a mixing point of the first and second gaseous or vapor phase compositions using an inert-gas buffer.

26. The method of claim 1, wherein, for a given distance along the reaction chamber:
the aerosol at an axis of the reaction chamber comprises a first temperature,
the walls of the reaction chamber comprise a second temperature, and
wherein the second temperature is greater than the first temperature by at least 100° C.

27. The method of claim 1, wherein, for a given distance along the reaction chamber:
the aerosol at an axis of the reaction chamber comprises a first temperature,
the walls of the reaction chamber comprise a second temperature, and
wherein the second temperature is greater than the first temperature by at least about 300° C.

28. The method of claim 1, wherein the first gaseous or vapor phase composition is obtained by heating, under pressure, the first composition contained as pure liquid in a first supply tank,
wherein the second gaseous or vapor phase composition is obtained by heating, under pressure, the second composition contained as pure liquid in a second supply tank, and
wherein the first and second compositions are heated separately.

29. A method for manufacturing a glass perform, comprising:
supplying a first gaseous or vapor phase composition to a reaction chamber, wherein the first gaseous or vapor phase composition is disposed to provide a hydrolyzable glass precursor;
supplying water as a second gaseous or vapor phase composition to the reaction chamber;
reacting the water and the first gaseous or vapor phase composition in the reaction chamber to form an aerosol of glass particles;
directing the aerosol along the reaction chamber, out of the reaction chamber, and toward a target; and
depositing glass particles of the aerosol onto the target;

wherein the first and second gaseous or vapor phase compositions are reacted in a substantial absence of an unreactive carrier gas, an aerosol-free gas stream, or an unreactive carrier gas and an aerosol-free gas stream, wherein a flow of the aerosol along the reaction chamber has a temperature gradient, and wherein, according to the temperature gradient, a temperature of the aerosol increases in a direction of the flow.

30. The method of claim 29, wherein a temperature of walls of the reaction chamber is greater than or equal to about 1,200° C.

31. The method of claim 29, wherein a temperature of walls of the reaction chamber is less than or equal to about 1,600° C.

32. The method of claim 29, wherein a temperature of walls of the reaction chamber is greater than or equal to about 1,200° C. and less than or equal to about 1,600° C.

33. The method of claim 29, wherein the aerosol comprises a first temperature at a time of formation of the aerosol, and wherein the first temperature is about 700° C.

34. The method of claim 29, wherein the aerosol comprises a second temperature as the aerosol is directed out of the reaction chamber, and wherein the second temperature is about 1,200° C.

35. The method of claim 29, wherein a temperature of the aerosol in the reaction chamber is greater than about 1,200° C.

36. The method of claim 29, wherein the aerosol comprises a first temperature at a time of formation of the aerosol, wherein the aerosol comprises a second temperature as the aerosol is directed out of the reaction chamber, and wherein the second temperature is greater than the first temperature by at least about 100° C.

37. The method of claim 29, wherein the aerosol comprises a first temperature at a time of formation of the aerosol, wherein the aerosol comprises a second temperature as the aerosol is directed out of the reaction chamber, and wherein the second temperature is greater than the first temperature by about 300° C.

38. The method of claim 29, wherein the aerosol comprises a first temperature at a time of formation of the aerosol, wherein the aerosol comprises a second temperature as the aerosol is directed out of the reaction chamber, and wherein the second temperature is greater than the first temperature by about 500° C.

39. The method of claim 29, wherein a temperature of the first gaseous or vapor phase composition supplied to the reaction chamber is below a predetermined temperature, and wherein a temperature of the second gaseous or vapor phase composition supplied to the reaction chamber is below the predetermined temperature.

40. The method of claim 29, wherein the predetermined temperature is a temperature at which a hydrolysis reaction between the first and second gaseous or vapor phase compositions is substantially incomplete.

41. The method of claim 39, wherein the predetermined temperature is less than about 800° C.

42. The method of claim 39, wherein the predetermined temperature is greater than or equal to about 600° C. and less than or equal to about 750° C.

43. The method of claim 39, wherein the predetermined temperature is about 700° C.

44. The method of claim 29, wherein a temperature of the target is greater than about 700° C.

45. The method of claim 29, wherein a temperature of the target is greater than about 800° C.

46. The method of claim 29, wherein a temperature of the target is less than a temperature of a stream of the aerosol impacting the target.

47. The method of claim 29, wherein a temperature of the target is at least 100° C. less than a temperature of a stream of the aerosol impacting the target.

48. The method of claim 29, wherein a temperature of a stream of the aerosol impacting the target is greater than or equal to about 800° C.

49. The method of claim 29, wherein a temperature of a stream of the aerosol impacting the target is greater than or equal to about 900° C.

50. The method of claim 29, wherein a temperature of a stream of the aerosol close to impacting the target is greater than or equal to about 1,000° and less than or equal to about 1,500° C.

51. The method of claim 29, wherein the reaction chamber comprises convergent walls, and wherein the aerosol is directed toward the target by the convergent walls.

52. The method of claim 29, further comprising:

shifting a mixing point of the first and second gaseous or vapor phase compositions using an inert-gas buffer.

53. The method of claim 29, wherein, for a given distance along the reaction chamber:

the aerosol at an axis of the reaction chamber comprises a first temperature, a wall of the reaction chamber comprises a second temperature, and wherein the second temperature is greater than the first temperature by at least 100° C.

54. The method of claim 29, wherein, for a given distance along the reaction chamber:

the aerosol at an axis of the reaction chamber comprises a first temperature, a wall of the reaction chamber comprises a second temperature, and wherein the second temperature is greater than the first temperature by at least about 300° C.

55. The method of claim 29, wherein the first gaseous or vapor phase composition is obtained by heating, under pressure, the first composition contained as pure liquid in a first supply tank, wherein the second gaseous or vapor phase composition is obtained by heating, under pressure, the second composition contained as pure liquid in a second supply tank, and wherein the first and second compositions are heated separately.

* * * * *

UNITED STATES PATENT AND TRADEMARK OFFICE
CERTIFICATE OF CORRECTION

PATENT NO. : 6,672,110 B2
DATED : January 6, 2004
INVENTOR(S) : Giacomo Stefano Roba et al.

It is certified that error appears in the above-identified patent and that said Letters Patent is hereby corrected as shown below:

Column 14,
Line 54, "perform," should read -- preform, --.
Line 67, "wherein according" should read -- wherein, according --.

Column 15,
Line 15, "than equal to about 1,600° ." should read -- than or equal to about 1,600°C. --.

Column 16,
Line 14, "chamer" should read -- chamber --.
Line 54, "perform," should read -- preform, --.

Column 17,
Lines 29-30, "about 1,200° C." should read -- about 700 °C and less than about 1,200 °C. --.
Line 59, "claim 29," should read -- claim 39, --.

Column 18,
Line 25, "1,000° and" should read -- 1,000 °C and --.

Signed and Sealed this

Sixteenth Day of November, 2004

JON W. DUDAS
*Director of the United States Patent and Trademark Office*